Figure 1:
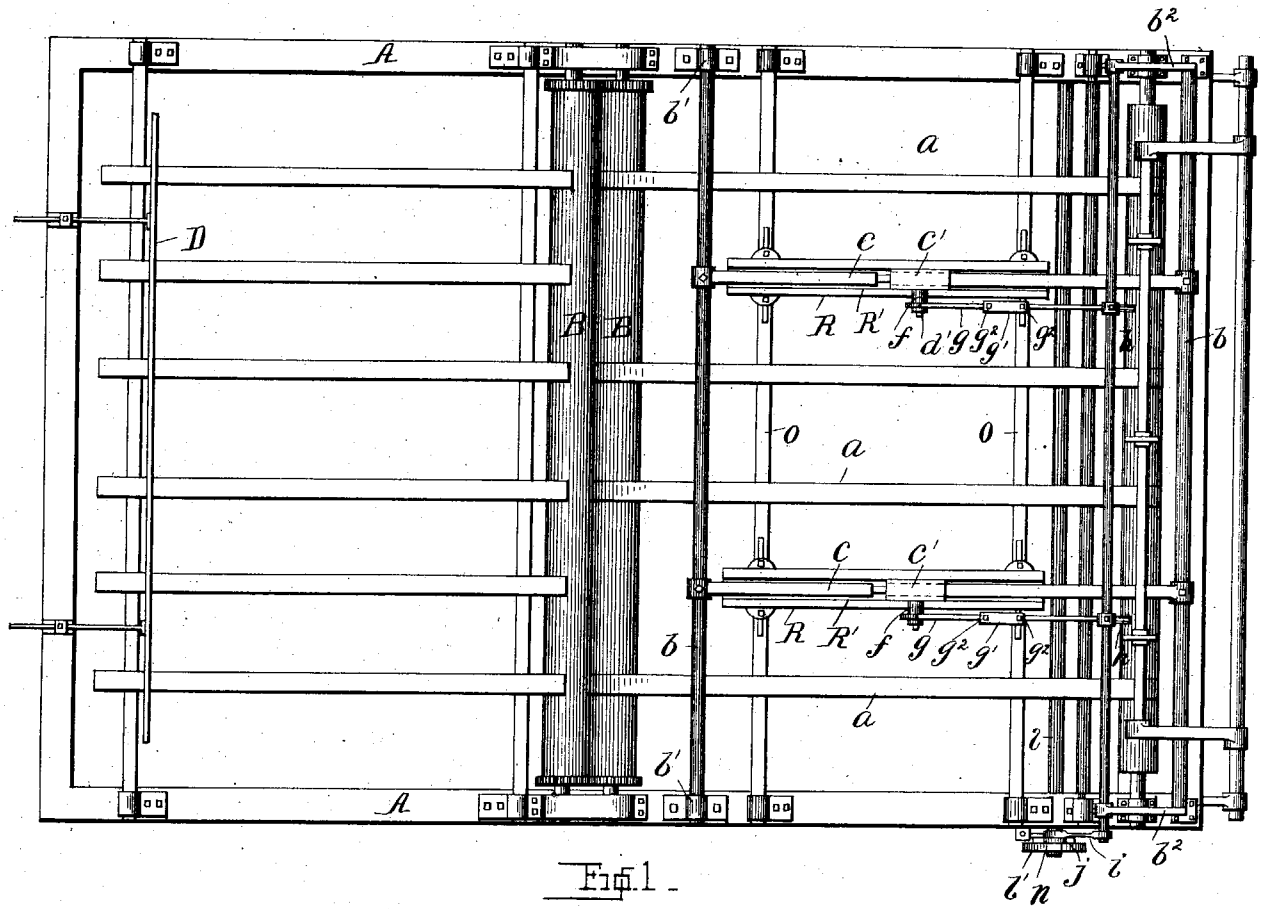

No. 11,723. Reissued Mar. 14, 1899.

T. C. DEXTER.

PAPER REGISTERING MECHANISM.

(Application filed Jan. 7, 1899.)

2 Sheets—Sheet 1.

WITNESSES

Mrs E. Knight.

M. V. Bidgood

INVENTOR

Talbot C. Dexter

BY

E. Laass his ATTORNEY

No. 11,723.
Reissued Mar. 14, 1899.
T. C. DEXTER.
PAPER REGISTERING MECHANISM.
(Application filed Jan. 7, 1899.)
2 Sheets—Sheet 2.
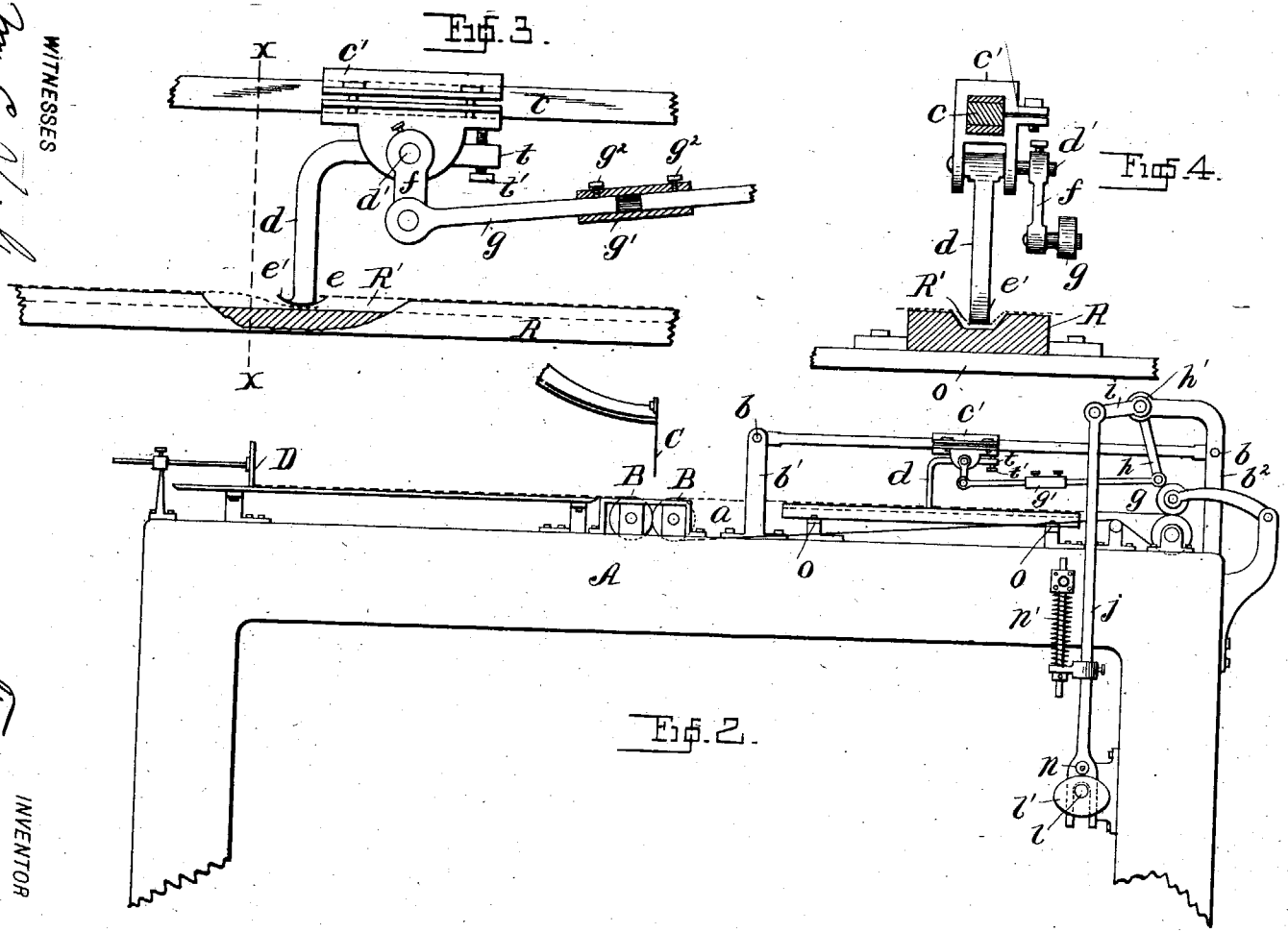
WITNESSES
Wm. E. Knight.
M. V. Bidgood
INVENTOR
Talbot C. Dexter
BY
E. Laass
his ATTORNEY

UNITED STATES PATENT OFFICE.

TALBOT C. DEXTER, OF PEARL RIVER, NEW YORK, ASSIGNOR TO THE DEXTER FOLDER COMPANY, OF NEW YORK, N. Y.

PAPER-REGISTERING MECHANISM.

SPECIFICATION forming part of Reissued Letters Patent No. 11,723, dated March 14, 1899.

Original No. 583,281, dated May 25, 1897. Application for reissue filed January 7, 1899. Serial No. 701,529.

*To all whom it may concern:*

Be it known that I, TALBOT C. DEXTER, of Pearl River, in the county of Rockland, in the State of New York, have invented new and useful Improvements in Paper-Registering Mechanisms, of which the following, taken in connection with the accompanying drawings, is a full, clear, and exact description.

This invention relates to paper-registering devices employed on machines designed to either fold or rule or otherwise operate on sheets of paper fed into the machine by traveling endless tapes. Heretofore such machines provided with sheet-registering attachments have been arranged to feed the successive sheets into the machine by means of traveling tapes or other feeding devices and temporarily arrest the sheets near registered position by means of a receding end gage, which then recedes to allow the tapes or feeding devices to impart a secondary movement to the sheets in the same direction to be arrested by the sheet-registering instruments when the sheets reach registered position.

The object of the invention is to provide efficient and reliable means for properly registering or alining the delivered sheet preparatory to being operated on by the machine; and to that end the invention consists, essentially, in the combination, with said machine, of a registering instrument adapted to engage a sheet after its initial movement is arrested by the end gage and draw or move it backward into registered position. To accomplish this result, the end gage is located to allow the sheet to be fed into the machine a little past the desired registered position when the registering instrument engages the sheet and draws it back.

In order that my invention may be fully understood, I will first describe the same with reference to the accompanying drawings and afterward point out the novelty with more particularity in the annexed claims.

Referring to the annexed drawings, Figure 1 is a plan view of a paper-folding machine provided with my improved paper-registering devices. Fig. 2 is a side elevation of the same. Fig. 3 is an enlarged side view of the registering instrument with a portion of the subjacent paper-supporting bar broken away to better illustrate the foot of said instrument, and Fig. 4 is a transverse section on line X X in Fig. 3.

Similar letters of reference indicate corresponding parts.

A denotes the main supporting-frame of the paper-folding machine.

B B represent the paper-folding rollers; C, the blade which tucks the paper between the folding-rollers; *a a*, the traveling endless tapes which extend from the feeding or paper-receiving end of the machine to the folding-rollers and convey the sheets of paper into the machine, and D represents the first fold-guide or end gage which arrests the movement of the paper delivered by the aforesaid tapes. All of said parts are arranged and operate in the usual and well-known manner.

Though I do not limit myself to any specific construction, arrangement, or location of the paper-registering instruments, yet I prefer to construct them to engage the rear edge of a previously-formed slit in the sheet and locate them between the folding-rollers and paper-receiving end of the machine, so as to facilitate the drawing back of the delivered sheet to its requisite registered position. I employ two of said registering instruments, disposed, respectively, at opposite sides of the longitudinal central line of the machine, as shown in Fig. 1 of the drawings. For supporting these instruments so as to adapt them to operate on sheets of paper of different lengths and widths I secure cross-bars *b b* to suitable standards $b'$ and $b^2$, mounted on the frame A at opposite sides of the machine. Said cross-bars are located one near the folding-rollers B B and the other at or near the paper-receiving end of the machine. To said cross-bars are attached the ends of longitudinal bars *c c*, which are parallel with the tapes *a a* and are adapted to be shifted laterally and clamped adjustably on the cross-bars to carry the registering instruments in lines directly over the slits made in the paper for the purpose of registering said paper. Upon each of the said longitudinal bars is mounted a sleeve $c'$, which embraces the bar and is slitted longitudinally to render it contractible and is provided with longitudinal flanges at the edges of the slit, through which flanges pass bolts, by means of which the sleeve can be contracted so as to subject it to sufficient friction on the rod to retard longitudinal movement of the sleeve, for the purpose hereinafter explained. To this sleeve is pivoted the registering instrument proper, consisting of a finger *d*, fastened to an axle *d'*, which is journaled in bearings on the sleeve. Said finger extends downward from the axle and has its foot or lower end provided with a spur *e*, which projects rearward or toward the paper-receiving end of the machine, and with a forwardly and upwardly curved shoe *e'*, which latter guards against the catching of the paper and tearing it during the forward movement of the finger. This finger or registering instrument receives oscillatory and longitudinal reciprocating motion by means of a crank *f*, attached to the axle of the finger and connected to the end of a rod *g*, which is parallel with the longitudinal bar *c* and is connected to one of the arms *h*, fastened to a rock-shaft *h'*, which is actuated by an arm *i*, fastened to the end of said shaft and connected to the end of a pitman *j*, which depends from said arm and is bifurcated at its lower end and straddles thereby a rotary shaft *l*, to which is secured a cam *l'*. To the pitman is pivoted a roller *n*, which rides upon the said cam and causes the pitman to be intermittently lifted by the cam. A spring *n'* and the weight of the pitman depress the latter, and thus the pitman receives reciprocating motion.

In connection with the finger or registering instrument *d* I prefer to employ a longitudinal paper-supporting bar R, which is arranged between the tapes *a a* and parallel therewith and is provided with a longitudinal groove R' in its top, as more clearly shown in Fig. 4 of the drawings. In order to allow the said registering instruments to be adjusted for operating on different papers having the registering-slits in different positions, I mount the bars R R laterally adjustable on cross-bars *o o*, secured to the frame A at opposite sides of the machine, and connect, laterally adjustable, the longitudinal bars *c c* to the cross-bars *b b* and the arms *h h* to the shaft *h'*; also make the rod *g* adjustable in length to operate the registering instrument *d* at a greater or less distance from the rear end of the paper. The adjustability of the said rod can be attained in various ways, one of which is illustrated in Fig. 3 of the drawings, and consists of forming said rod of two end sections having their adjacent ends inserted into a sleeve *g'* and adjustably fastened therein by set-screws $g^2$.

The operation of the described registering devices is as follows: The paper is conveyed into the machine by means of the tapes *a a*, and its motion is arrested by the usual end gage D, which leaves the paper lying with its central portion across the folding-rollers B B. During this operation the registering instruments *d d* are carried to their extreme forward position and are lifted out of the path of the paper by the rods *g g* being pushed forward by the arms *h h* of the rock-shaft *h'*. As soon as the sheet has come to rest the rods *g g* begin to move back and thereby first tilt the fingers or registering instruments *d d*, so as to cause their lower ends to depress the paper in the grooves R' of the bars R and then draw said instruments back, and in this movement the spurs *e* of the instruments *d* enter into the slits of the paper, which slits are opened by the aforesaid depression of the paper. In the further rearward movements of said instruments they come in contact with the rear edges of the slitted portions of the paper and draw the paper rearward to its requisite registering position. As soon as it has arrived at this position the rods *g* begin their forward movement and thereby lift the registering instruments *d* out of engagement with the paper and release the same, to be then tucked into the bite of the folding-rollers B B by the blade C. In order to prevent the tapes from disturbing the paper from its aforesaid registering position, the movement of the blade C is to be so timed as to cause it to come in contact with the paper the moment the paper is released from the registering instruments.

To guard against excessive downward pressure of the finger or instrument *d* upon the paper, the pivoted end of said finger is provided with a rearward extension *t*, to which is adjustably connected a vertical set-screw *t'*, which by contact with the sleeve *c'* limits the downward movements of the finger *d*.

The essential feature of novelty of my improved sheet-registering machine comprises, in combination with the paper-folding machine or analogous machine, suitable sheet-registering instruments adapted to engage the sheet after it has been fed into the folding-machine or other machine and draw it back into registered position in readiness for the operation of the folding-knife or other paper-operating device. The specific structure and location of the registered instruments described and illustrated may be altered to suit varying requirements, as they are not of the essence of my invention.

What I claim as my invention is—

1. In a paper-folding machine or analogous machine provided with traveling tapes conveying paper into the machine, paper-registering instruments located and reciprocating in lines parallel with said tapes and movable to and from the plane thereof and drawing the paper back to its registering position, as set forth.

2. In a paper-folding machine or analogous machine, a registering instrument located in the path of the sheets and drawing the sheet back into registering position by engagement of the registering instrument with the edge of the slit previously made in the paper for that purpose.

3. In a paper-folding machine or analogous machine, a sheet-stopping gage, a registering instrument located in the path of the sheets and drawing the sheet back from the gage into registering position by engagement of the registering instrument with the edge of the slit previously made in the paper for that purpose.

4. In a paper-folding machine or analogous machine provided with traveling tapes conveying paper into the machine, paper-registering instruments located near the receiving end of the machine and reciprocating in lines parallel with said tapes and movable to and from the plane thereof and drawing the paper back to its registering position, as set forth.

5. In a paper-folding machine or analogous machine, a registering instrument located adjacent to the receiving end of said machine and drawing the sheet back toward said end of the machine and into registering position by engagement of the registering instrument with the edge of the slit made in the paper for that purpose.

6. In a machine designed to receive paper provided with slits at predetermined positions, the combination with tapes conveying the paper into the machine, of paper-supporting bars located adjacent to the receiving end of the machine and provided with longitudinal grooves in their tops and longitudinally-reciprocating registering instruments movable vertically to and from the grooves of said bars and depressing the paper in said grooves during the rearward movement of said instruments to engage the edges of the slits in the paper and thereby draw the paper rearward to its registering position.

7. In combination with the paper-conveying tapes, a sheet-stopping gage located at the end opposite to the receiving end of the machine, registering instruments adjacent to said receiving end of the machine and reciprocating on lines parallel with the tapes and movable vertically to and from the plane of said tapes to engage the sheet arrested by the aforesaid gage and drawing the sheet back during the rearward movement of the registering instrument and thereby carrying the sheet to its registering position, as set forth.

8. In a paper-folding machine comprising paper-folding rollers, a blade tucking the paper between the rollers, tapes delivering the paper to the rollers, a gage arresting the forward movement of the paper, longitudinal bars between the rollers and receiving end of the machine and provided with longitudinal grooves in their tops, and paper-registering instruments reciprocating in lines parallel with said bars and movable vertically to and from the grooves thereof to depress the paper therein and thereby open the slits made in the paper for that purpose, said registering instruments engaging during their rearward movement the edges of the slits in the paper and thereby drawing the paper to its registering position, as set forth.

9. In combination with the folding-rollers, tapes conveying the paper to said rollers and a sheet-arresting gage, the combination of bars extending across the machine respectively at the receiving end thereof and adjacent to the folding-rollers, longitudinal bars secured laterally adjustable to said transverse bars, sleeves mounted movable longitudinally on said longitudinal bars, registering instruments carried on said sleeves movable to and from the plane of the tapes and provided with rearwardly-projecting spurs to enter into the slits made in the paper for that purpose and causing said delivered paper to be drawn back to its registering position by the rearwardly-traveling registering instruments, as set forth.

TALBOT C. DEXTER.

Witnesses:
WM. E. KNIGHT,
M. V. BIDGOOD.